Nov. 3, 1964  A. W. DOYLE ETAL  3,155,141
APPARATUS FOR ATOMIZING AND BURNING A LIQUID FUEL
Filed June 18, 1962  4 Sheets-Sheet 1

Arnold W. Doyle
Robert R. Perron    INVENTORS
John R. Swanton, Jr.

BY /s/ Burnie A. Lepper
Attorney

Nov. 3, 1964     A. W. DOYLE ETAL     3,155,141
APPARATUS FOR ATOMIZING AND BURNING A LIQUID FUEL
Filed June 18, 1962     4 Sheets-Sheet 2

Arnold W. Doyle
Robert R. Perron
John R. Swanton, Jr.
       INVENTORS

BY    *[signature]*
       Attorney

Nov. 3, 1964  A. W. DOYLE ETAL  3,155,141
APPARATUS FOR ATOMIZING AND BURNING A LIQUID FUEL
Filed June 18, 1962  4 Sheets-Sheet 3

Arnold W. Doyle
Robert R. Perron
John R. Swanton, Jr.
INVENTORS

BY *Bernie A. Lapper*
Attorney

Arnold W. Doyle
Robert R. Perron
John R. Swanton, Jr.
INVENTORS

United States Patent Office 3,155,141
Patented Nov. 3, 1964

3,155,141
APPARATUS FOR ATOMIZING AND BURNING
A LIQUID FUEL
Arnold W. Doyle, Watertown, Robert R. Perron, Beverly, and John R. Swanton, Jr., Newton, Mass., assignors to Arthur D. Little, Inc., Cambridge, Mass., a corporation of Massachusetts
Filed June 18, 1962, Ser. No. 203,044
2 Claims. (Cl. 158—28)

This invention relates to atomizers and more particularly to atomizers suitable for use with burners designed to achieve complete and efficient combustion of fuels.

Although the atomizer described hereinafter is suitable for atomizing a wide variety of liquids for many purposes, for convenience of presentation the apparatus will be described in terms of its use in atomizing fuel oil which is to be burned with air in a burner to supply thermal energy.

Fuel oil has long been known as an excellent source of heat, particularly for providing controlled heating for buildings such as homes and the like. In order to obtain the maximum thermal energy from fuel oil it is customary to generate large surface areas of the fuel oil through atomization. It is then subsequently necessary to provide proper mixing of the fuel oil and air to achieve proper combustion. A widely used type of oil burner for home heating, for example, burns fuel which has been atomized by forcing the fuel under pressure through a swirl nozzle embodying a small orifice. Often the fuel oil is pumped at a pressure of about 100 p.s.i. through the orifice to achieve the desired degree of atomization. This type of atomizer then requires a high-pressure hydraulic system, which in turn means that considerable work must be done on the oil through the use of a high-pressure pump and an electric motor. Extended experience with the prior art atomizers described above has indicated that they normally require servicing about once a year to insure that the orifice remains open to permit the desired atomization. It would be highly desirable to have available a means for atomizing and burning liquids and particularly fuel oil which was more reliable than the system now in use. It would also be desirable to have an improved atomizing device which could incorporate a low-pressure or gravity feed system which was safe, reliable, and achieved better atomization.

It is therefore a primary object of this invention to provide a fuel oil burner which incorporates an atomizing device which is highly reliable in its operation and therefore which lends itself in particular to home burner installations. It is another object of this invention to provide a device of the character described which achieves better atomization in that atomization can occur at a very low flow rate, and that the size of the atomized particles can be readily controlled by controlling the parameters of the atomizer. It is an additional object of this invention to provide a fuel oil burner with an atomizer which does not require an orifice of such small size that it is subject to plugging. It is yet another object of this invention to provide such a device which does not require a motor for a high-pressure component, but which, on the contrary, may use gravity feed for delivery of the liquid to be atomized. It is another object to provide a fuel burner which is reliable, silent in operation and safe to maintain. Other objects of the invention will in part be obvious and will in part be apparent hereinafter.

The invention accordingly comprises the features of construction, combination of elements and the arrangement of parts which will be exemplified in the constructions hereinafter set forth and the scope of the invention will be indicated in the claims.

For a fuller understanding of the nature and objects of the invention reference should be had to the following detailed description taken in connection with the accompanying drawings in which FIG. 1 illustrates an atomizer of this invention along with a suitable circuit;

In brief, the atomizing apparatus of this invention comprises a transducer, means for driving the transducer, a voltage feedback means, and liquid delivery means. The transducer in turn comprises in combination an atomizing surface, means for oscillating the atomizing surface in a direction normal to the plane of the atomizing surface and at a supersonic rate. The voltage feedback circuit associated with the transducer includes means for achieving a feedback voltage, and a voltage amplifier the output of which exhibits a phase relationship, as compared to the output of the power amplifier which is part of the transducer driving means, such that the complete system is caused to oscillate at a frequency determined by the acoustical resonance of the transducer and at an optimum frequency to achieve liquid atomization. As will become apparent, modifications of these various components of the apparatus are possible and are to be construed as falling within the scope of this invention.

Although the supersonic oscillation of a surface to achieve atomization is known it is believed that the atomizer of this invention, along with the fuel oil burner in which it is incorporated, is unique in its incorporation of a voltage feedback component which achieves a self-locking of the driving means such that the oscillating amplifier is in acoustical resonant frequency with the transducer. Several ways of achieving the required voltage feedback will be illustrated in the description and accompanying drawings.

Figure 1:
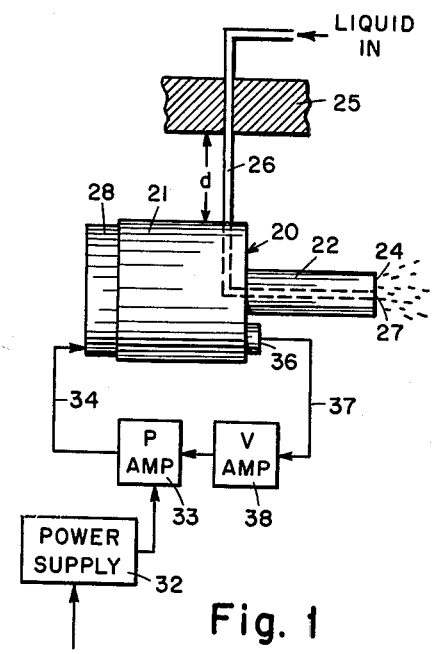

The atomizer of this invention is illustrated in FIG. 1. All of the figures and their accompanying descriptions will be directed toward the atomization of fuel oil as an example. However, the method and apparatus are not limited to atomizing liquid fuels, but may be used with any other liquid equally well. The apparatus of FIG. 1 will be seen to consist of a stepped horn formed of a large segment 21 and extension or small segment 22. A stepped horn of such a configuration is known to achieve a displacement amplification which is directly related to the ratio of the area of the large segment face to the area of the small segment face. As will be seen in FIG. 10, other horn configurations are suitable.

The small segment 22 affords an atomizing surface 24 at its terminal end. In the apparatus of FIG. 1 the liquid to be atomized is fed through a fuel conduit 26 which in this case passes through the stepped horn and terminates in an orifice 27 in the atomizing surface 24. The horn is driven by a suitable driving means such as a crystal 28. The crystal is formed of a natural piezoelectric material such as quartz or of a polarized ceramic such as a lead zirconate titanate polycrystalline material or a barium titanate polycrystalline material. FIG. 1 also illustrates one way in which the atomizer may be mounted by suspending it by means of the fuel conduit 26 from a supporting member 25. If distance $d$ is so chosen to be equivalent to a one-quarter wavelength of the transducer, then the atomizer will be fixed at a nodal point of the supporting member and essentially no vibration or energy loss will be imparted to the supporting member.

The atomizer of this apparatus includes a voltage feedback element as an essential component. In FIG. 1 this component comprises a feedback crystal 36 which is mounted on the face of the large segment 21 at a point where oscillation occurs. Power is supplied to the driving crystal through a suitable power supply 32 by way of an amplifier 33 and power line 34. The feedback circuit 37, including a voltage amplifier, completes the circuit.

Modifications in the apparatus of FIG. 1 are within the scope of this invention and these are directed to the means by which the liquid to be atomized is brought into contact with the oscillating atomizing surface, the means by which the voltage feedback is achieved, means by which driving crystals are attached to the horn, and the means by which the horn is driven. These modifications are illustrated in FIGS. 2–10.

Figure 2:
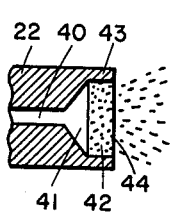
FIGS. 2 and 3 illustrate modifications in the method by which fuel oil is brought into operational contact with the atomizer.
Figure 3:
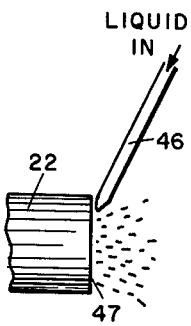

FIGS. 2 and 3 illustrate two different ways in which the liquid to be atomized is supplied to the atomizing surface. In FIG. 2 a liquid feed line 40 is located within the interior of the horn which has at its terminal end internal of the horn an enlarged flared space 41 which in turn is in communication with a porous body 42 through which passes the liquid to be atomized. The porous body 42 is held in position by an annular extension 43 of the small segment 22 of the horn, and the liquid is made available at the porous atomizing surface 44. In the modification in FIG. 3 the liquid to be atomized is supplied through an external conduit 46 and directed onto a solid imperforate atomizing surface 47 which is the terminal end of the small segment 22.

Figure 4:
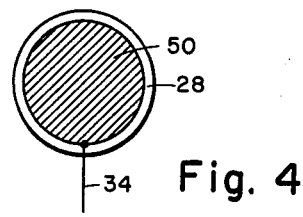
FIG. 4 is an end view of a piezoelectric crystal used as a driving means.

FIG. 4 is an end view of the driving crystal 28 shown in FIG. 1. This drawing illustrates the manner in which the crystal may be attached to the power circuit through a crystal electrode 50 which preferably covers the major portion of the crystal surface. Many other shapes, sizes and locations of the crystal electrode are also suitable for making the necessary circuit connections to the crystal.

Figure 5:
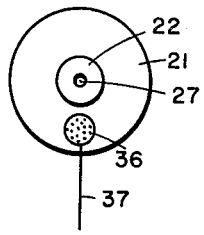
FIGS. 5 and 6 illustrate modifications in crystal configurations used in a voltage feedback circuit.
Figure 6:
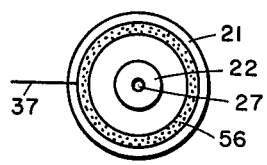
Figure 7:
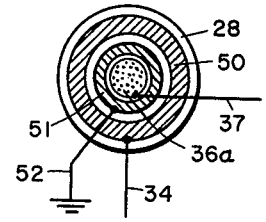
FIG. 7 illustrates an additional modification in a portion of the driving and feedback system of the circuit.
Figure 9:
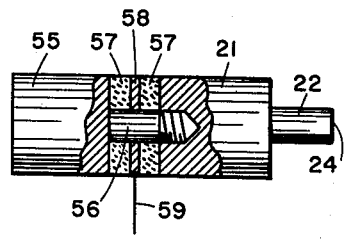
FIG. 9 shows, partially in cross-section, the use of two driving crystals mechanically connected to a horn for use in the atomizer of this invention.

FIGS. 5, 6 and 7 are directed to modifications showing various forms of feedback arrangements. FIG. 5 illustrates the feedback crystal 36 as a small single crystal placed on the surface of the larger segment 21 at an oscillating point. FIG. 6 illustrates the feedback crystal in the form of an annular ring 56 attached to the outer surface of the larger segment 21, this crystal also being affixed to an oscillating portion of the face of large segment 21. FIG. 7 shows an arrangement in which the driving crystal 28 is so wired as to serve also as the feedback crystal. The input crystal electrode 50 assumes an annular shape, while the feedback electrode 36a is positioned within the area defined by electrode 50. A guard electrode 51 wired to ground 52 provides the necessary electrical insulation between electrodes 50 and 36a.

Figure 8:
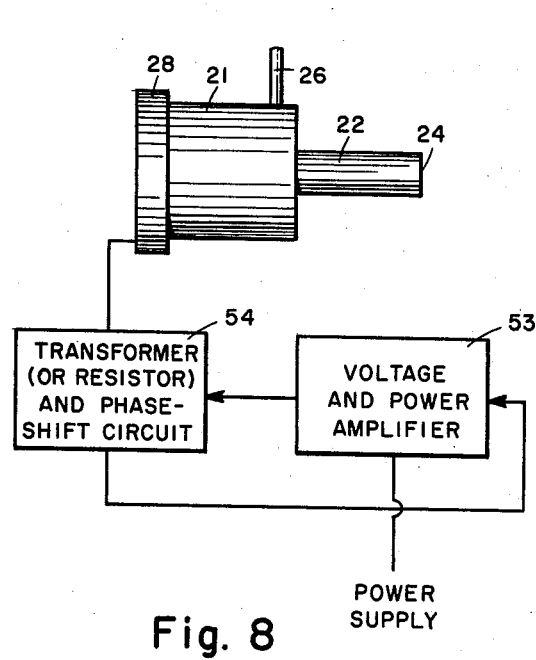
FIG. 8 illustrates an alternative apparatus for supplying voltage feedback.
Figure 10:
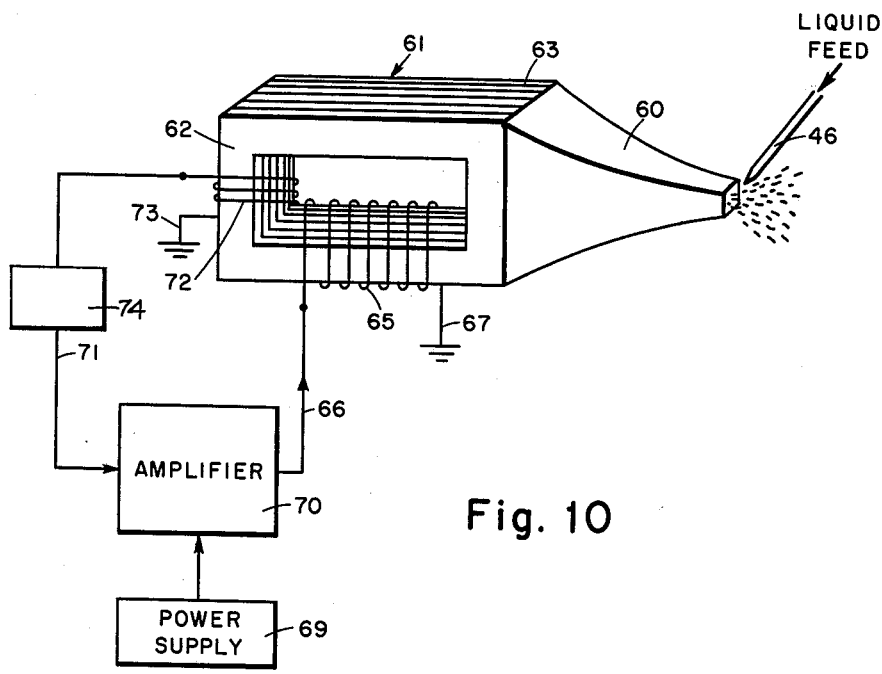
FIG. 10 illustrates a magnetostrictive driving means for the transducer.

In FIGS. 1 and 7 piezoelectric crystals are used in the voltage feedback portion of the circuit. However, alternative circuit elements are also suitable for causing the amplifier to oscillate at the frequency determined by the acoustical resonance of the transducer, i.e. horn plus crystal (or other driving means). Two such alternative circuit elements are illustrated in FIGS. 8 and 10, the latter of which is described below. In the circuit of FIG. 8 a transformer (or resistor) and associated phase-shift circuit are used to replace the feedback crystal of FIG. 1. The transformer (or resistor) provides a voltage signal which can be fed back into the amplifier.

In the operation of the atomizer of FIG. 8, at the preferred frequency resonance of the transducer, the current to the transducer becomes a maximum. Thus, when a transformer is incorporated in the circuit (shown at 54) the current flowing through the transformer primary will produce a voltage maximum at the secondary of the transformer. This voltage is fed back to the amplifier input through a suitable network such that oscillations are maintained preferably essentially at the series resonance mode frequency of the transducer. Such a network preferably consists of wave filters such that only a region close to the desired frequency is fed back and also contains an appropriate phase-shift circuit which will assure that the amplifier input voltage will have the proper phase relationship with the output in order to maintain oscillations.

In a similar manner, if a resistor is used in the circuit to replace the transformer, the current flowing through the resistor will produce a voltage maximum when the transducer resonates at the series resonance mode and thus provide voltage feedback.

If crystals are used as the driving means for the horn in the transducer, they must of course be held in firm contact with the horn either through an adhesive or by suitable mechanical clamping means. If an adhesive is used, then it preferably should have acoustic properties substantially the same as that of the other transducer materials. Epoxy resins have been found to be particularly good for this purpose. A number of mechanical clamping means are suitable, an example of one being shown in FIG. 9. In this modification two annular-shaped crystals 57 are used and held in place by means of an end stub 55 screwed tightly into the large segment 21 of the horn by means of screw 56. Crystal electrode 58 is placed between the driving crystals 57, and wired into the circuit through a suitable lead 59. In mounting crystals as in FIG. 9 they must be so oriented that the crystal faces in contact with the crystal electrode are of the same polarity, i.e. both be plus or both be minus.

FIG. 10 illustrates a driving means comprising a magnetostrictive device. It also illustrates another type of horn, namely the graduated or contoured horn 60 and the use of a coil in the voltage feedback circuit in place of a crystal. Although this arrangement illustrates the delivery of the liquid to the atomizing surface by means of an external feed line, it is, of course, also possible to use other liquid supply systems such as illustrated in FIGS. 1 or 2 in place of that shown in FIG. 10. In the arrangement of FIG. 10 the horn 60 is driven by the magnetostrictive device generally illustrated at 61. Attached to the horn 60 is a magnetic core 62 which is made up of laminated nickel plates 63. Alternatively, the core may be formed of a magnetostrictive ferrite material. Power is supplied through coil 65 which in turn is connected to power line 66 and ground 67. A power supply 69 furnishes the necessary current to amplifier 70. In the arrangement in FIG. 10 the feedback circuit comprises coils 72 which are in turn connected through circuit 71, through a feedback network 74, into amplifier 70, and through circuit 73 to ground.

Figure 11:
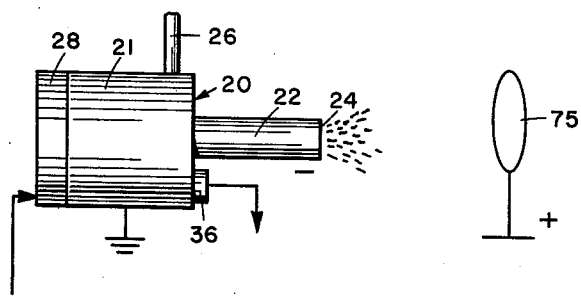
FIG. 11 shows the use of a high-voltage electrode to provide an electrostatic field in conjunction with the apparatus of FIG. 1.
Figure 12:
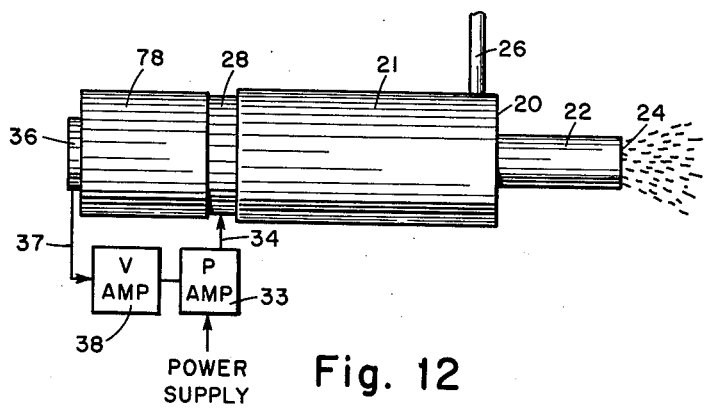
FIG. 12 is a modification of the apparatus of FIG. 1 showing the use of an opposing-mass stub.

FIGS. 11 and 12 illustrate additional components which may be incorporated in the basic atomizer apparatus to contribute to its performance and reliability. In FIG. 11 it will be seen that there is supplied a high-voltage electrode 75 which provides an electrostatic field at the atomizing surface. It should be pointed out that this electrostatic field generator is not the primary means by which the liquid is atomized but serves in a supplementary capacity in controlling the size of the droplets and their direction. Thus, this electrostatic field is used to enhance atomization and achieve a desired direction of flow.

FIG. 12 illustrates the incorporation of an opposing-mass stub 78 which is designed to permit placement of the crystal at a nodal point and hence to achieve more flexibility in transducer design. The stub must be so shaped and of such a length that it is an integral multiple of one-quarter wavelength of the resonant frequency of the transducer. The choice of the number of one-quarter wavelengths will depend on whether the driving crystal is located at a nodal or antinodal point in the transducer. If it is located at a node point it should be an odd multiple and if at an antinode point it should be an even multiple quarter wavelength.

Although in FIG. 12 the feedback crystal 36 is shown to be located at the end of the stub which is opposite to that end at which the driving means is attached, it is, of course, possible to place the feedback crystal in the positions shown in FIGS. 1 and 5.

Figure 13:
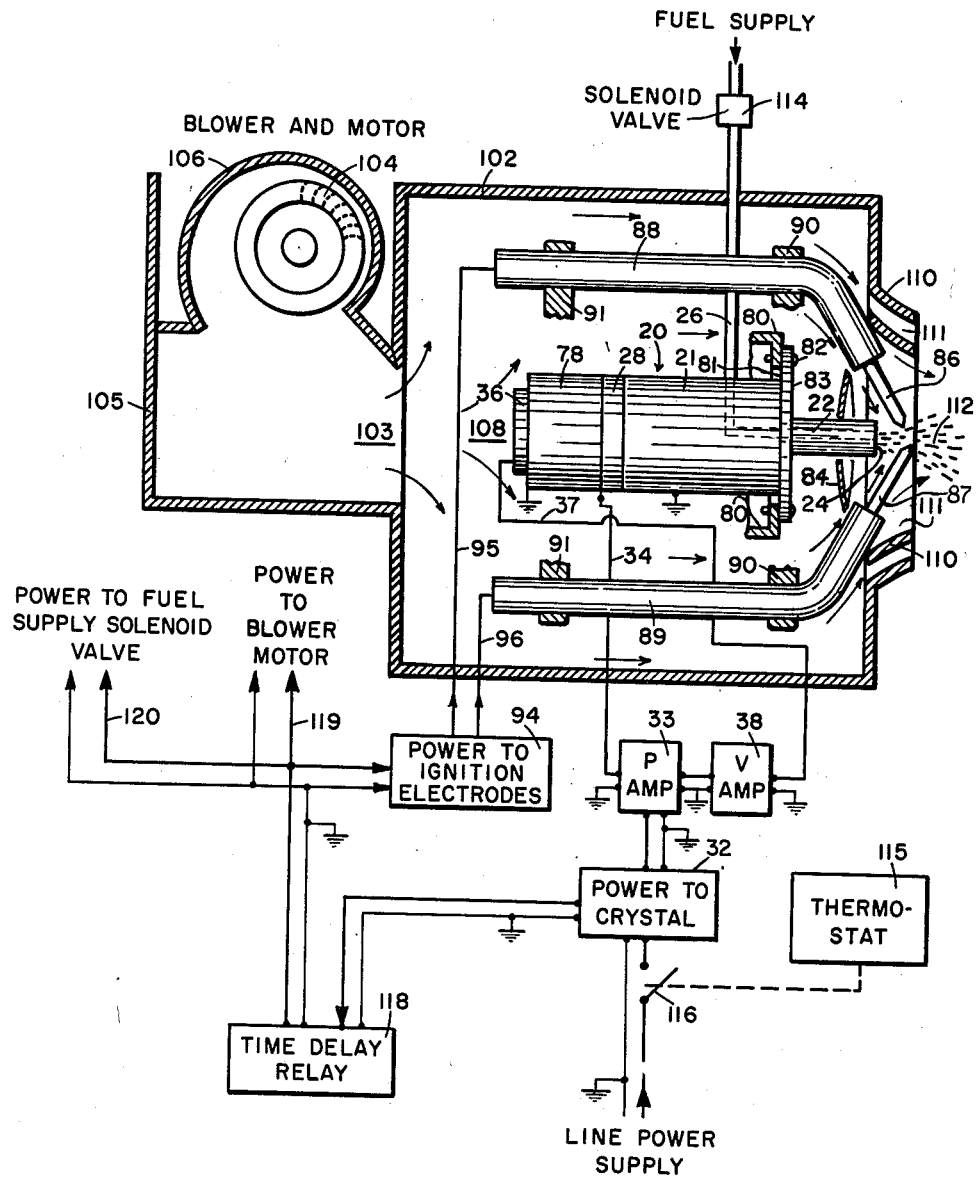
FIG. 13 illustrates, partially in cross-section, a fuel oil burner incorporating the atomizer of this invention.

FIG. 13 illustrates the use of the herein described atomizers in a burner, such as that which would be suitable for burning fuel oil for heating a home or other building. The apparatus of FIG. 13 is particularly designed to achieve a controlled flow of air, fuel, and combustion gases. In doing this it also performs another very important role, namely the continual cooling of the driving crystal to maintain it at temperatures well below that at which the crystal could become depolarized.

It is well known that many of the piezoelectric ceramic materials will depolarize above a certain temperature and hence it is preferable to insure that these crystals are always maintained well below this critical temperature. In the use of an atomizer such as disclosed herein in a fuel oil burner for home use it is, of course, requisite that the burner be completely reliable. This, in turn, means keeping the driving crystal in its polarized condition. The modification of FIG. 13 is designed to accomplish this.

FIG. 13 illustrates the incorporation of the atomizer of FIG. 12 in a burner, and like numbers are used to refer to like elements in these drawings.

In the burner of FIG. 13, the atomizing device (comprising the horn 20, driving crystal 28, opposing-mass stub 78 and feedback crystal 36) is supported by an annular support member 80 which is affixed to an extension or flange 81 of the large segment 21 of the horn. This joining of the horn and the support is accomplished at a nodal point in the flange as by means of screws 82. A heat shield 84 is used to reflect heat from the flame away from the horn. In addition to the use of heat shield 84 the flanged portion of the large segment 21 may be of a reflective material designed to supplement the heat shield in its role as heat reflector. Other suitable means for mounting the atomizer in the burner may, of course, be used, and one of these is illustrated in FIG. 1.

Ignition is achieved in the burner through the use of ignition electrodes 86 and 87 which in turn are shielded throughout a major portion of their length by suitable insulations 88 and 89, respectively such as ceramic tubing. The electrodes are supported within the system on supports 90 and 91 and they draw their electrical supply from a power source 94 through power lines 95 and 96. The driving crystal 28 and the feedback crystal 36 are electrically connected through a circuit similar to that in FIG. 12.

Surrounding the atomizer and the electrodes is a housing 102 which provides an air inlet 103. Housing 102 is integral with a blower housing 106 and extension 105 which together provide the air intake means and contain a blower with its motor, the latter two components indicated by numeral 104. Air is forced by means of the blower 104 through inlet 103 into the housing 102 and directed through the area indicated at numeral 108 which surrounds the driving crystal 36. This incoming air as it passes around the crystal maintains it at a suitable temperature. The air is then subsequently forced around the transducer, the electrodes and out through passages 111 which are defined by louvers 110. Thus the air which is to be used in the combustion of the fuel is swept forward past the electrodes and thoroughly mixed with the fuel.

Automatic operation of the burner is provided and is controlled by means of thermostat 115 which in turn actuates switch 116. If the inherent operating characteristics of amplifiers 33 and 38 require a period of warmup, then the circuit is provided with a time delay relay 118. If, however, the amplifiers are solid state devices, then time delay relay 118 may be omitted and the line power supply, through switch 116, is connected directly to the crystal power 32 and to ignition electrode power 94. The supply of fuel to the atomizing surface 24 is controlled by a solenoid valve 114. This solenoid valve, along with the blower motor, is actuated simultaneously with the power supply to the ignition electrodes, through suitable connections illustrated as lines 120 and 119, respectively. It will be seen then that the thermostat by actuating switch 116 starts the flow of oil, the blower motor, and the driving means of the transducer as well as igniting the fuel. If amplifier warmup for crystal operation is required, this is also provided.

It will be apparent from FIGS. 1, 8 and 11, that when a piezoelectric crystal is employed as the driving means for this atomizer, it may be varied in size, e.g., it may approximate the size of the large horn segment 21 or it may be smaller or larger than this large segment. In assembling a crystal driven horn it is necessary to take into account the acoustical properties of the horn and the inherent properties of the crystal. It will be appreciated that the size and shape of the horn and crystal as well as the choice of material from which the horn is formed may be varied to obtain a predetermined frequency at the atomizing surface 24 or the other atomizing surface shown in FIGS. 2 and 3. Among the materials which may be used for the horn are those materials which have good acoustical properties and include stainless steel, aluminum and the like.

It will be seen from the above description and drawings that this invention provides a fuel oil burner incorporating an efficient atomizer for liquids which does not depend upon high liquid pressure and/or very small orifices for atomization. Moreover, by the use of such additional features, e.g., an electrostatic field and an opposing-mass stub the performance of the atomizer can be further enhanced. The incorporation of a voltage feedback component with its attendant circuitry provides a self-locking frequency feature for optimum burner performance.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:
1. Fuel oil burner, comprising in combination
   (a) a fuel atomizer comprising
      (1) a transducer including an atomizing surface capable of oscillating at a supersonic rate;
      (2) fuel oil delivery means including electrically operable valve means, said fuel delivery means being adapted to deliver fuel oil to said atomizing surface;
      (3) voltage feedback means associated with said transducer and including voltage and power amplifying means exhibiting a phase relationship such that said amplifying means is caused to oscillate at a frequency determined by the acoustical resonance of said transducer;
      (4) pickup means mechanically coupled to said transducer and electrically connected to said voltage feedback means;

(b) ignition electrodes operable adjacent said atomizing surface;
(c) motor-operated blower means;
(d) housing means surrounding that portion of said atomizer comprising said transducer, said fuel oil delivery means and said pickup means, said ignition electrodes and said blower and adapted to cause incoming air for combustion to sweep around said atomizer thereby to maintain said portion of said atomizer below a predetermined temperature;
(e) thermostat control means adapted to control electrical power to said valve means, to said transducer, to said voltage feedback means, to said ignition electrodes and to said motor whereby they are actuated to function and to supply hot combustion gases when the need is indicated by said thermostat control means.

2. Fuel oil burner in accordance with claim 1 further characterized as having heat shield means associated with said transducer and adapted to reflect the heat of combustion away from said transducer.

References Cited in the file of this patent
UNITED STATES PATENTS

| | | |
|---|---|---|
| 2,453,595 | Rosenthal | Nov. 9, 1948 |
| 2,481,620 | Rosenthal | Sept. 13, 1949 |
| 2,504,831 | Griss | Apr. 18, 1950 |
| 2,512,743 | Hansell | June 27, 1950 |
| 2,792,674 | Balamuth et al. | May 21, 1957 |
| 2,834,158 | Petermann | May 13, 1958 |
| 2,881,092 | Sedlacsik | Apr. 7, 1959 |
| 2,949,900 | Bodine | Aug. 23, 1960 |
| 3,016,233 | Olmstead | Jan. 9, 1962 |